(12) United States Patent
Vertegaal

(10) Patent No.: US 8,136,881 B2
(45) Date of Patent: Mar. 20, 2012

(54) CHILD VEHICLE RESTRAINT SYSTEM

(75) Inventor: Hendricus Johannes Vertegaal, Hengelo (NL)

(73) Assignee: HTS Hans Torgersen & Son AS, Kroderen (NO)

( * ) Notice: Subject to any disclaimer, the term of this patent is extended or adjusted under 35 U.S.C. 154(b) by 183 days.

(21) Appl. No.: 12/554,019

(22) Filed: Sep. 4, 2009

(65) Prior Publication Data

US 2010/0060046 A1    Mar. 11, 2010

(30) Foreign Application Priority Data

Sep. 8, 2008    (NO) .................................. 20083819

(51) Int. Cl.
*B60R 21/00* (2006.01)
(52) U.S. Cl. .................................. 297/253; 297/216.18
(58) Field of Classification Search .................. 297/253, 297/216.11, 216.18
See application file for complete search history.

(56) References Cited

U.S. PATENT DOCUMENTS

| 4,215,900 A | 8/1980 | Coult |
| 5,685,603 A | 11/1997 | Lane, Jr. |
| 6,375,260 B1 * | 4/2002 | Hiramatsu et al. ........ 297/256.16 |
| 6,719,369 B1 * | 4/2004 | Wagner ....................... 297/250.1 |
| 7,044,549 B2 * | 5/2006 | Maier et al. .................... 297/253 |
| 7,246,853 B2 * | 7/2007 | Harcourt et al. ............ 297/250.1 |
| 7,328,946 B2 * | 2/2008 | Hendrikus Van Montfort et al. .............................. 297/253 |
| 7,384,099 B2 * | 6/2008 | Schleif et al. .................. 297/253 |
| 7,488,034 B2 * | 2/2009 | Ohren et al. .............. 297/216.11 |
| 2009/0273215 A1 * | 11/2009 | Barker et al. .................. 297/253 |

FOREIGN PATENT DOCUMENTS

| DE | 19952771 | 5/2001 |
| DE | 10216070 | 4/2003 |
| DE | 102004022316 | 11/2005 |
| EP | 1600325 | 11/2005 |
| EP | 1759917 | 3/2007 |
| EP | 1900567 | 3/2008 |
| GB | 2417416 | 3/2006 |
| WO | WO2005123447 | 12/2005 |
| WO | WO2006123169 | 11/2006 |

* cited by examiner

*Primary Examiner* — Sarah B McPartlin
(74) *Attorney, Agent, or Firm* — Christian Abel

(57) ABSTRACT

The present invention relates to a child restraint system (1) with a base (2) having a lower surface resting on a sitting portion of a vehicle, where the base (2) through ISOFIX latching means is engaged with anchorage means (12) in the vehicle seat (13), thereby providing a pivot connection between the base (2) and the anchorage means (12). Through an energy absorbing mechanism (7) impact energy can be absorbed, thus reducing the degree of rotation of the child restraint (1).

10 Claims, 3 Drawing Sheets

CHILD VEHICLE RESTRAINT SYSTEM

FIELD OF THE INVENTION

Figure 1:
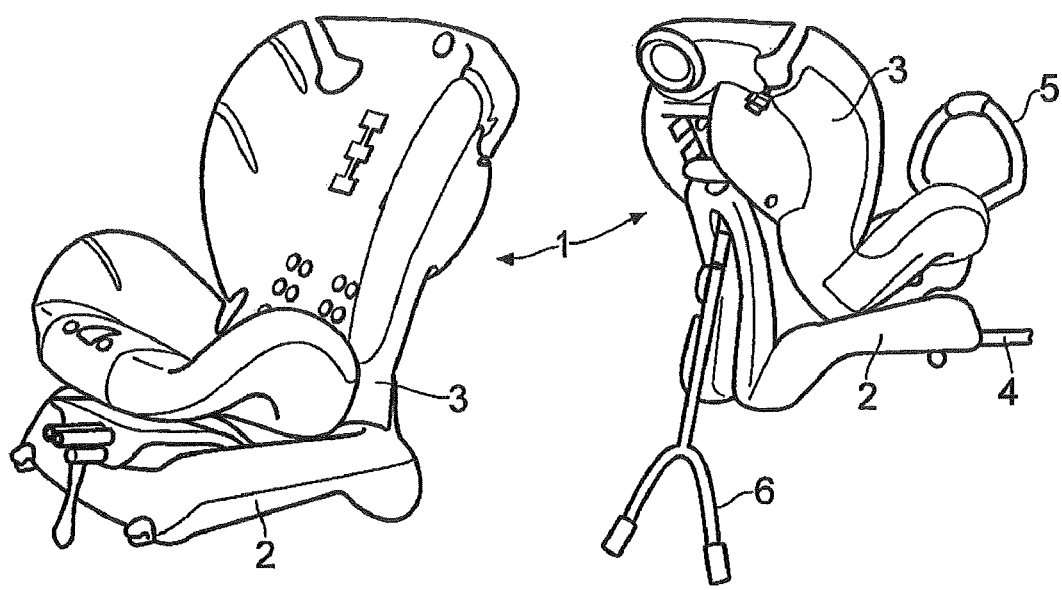

The present invention relates to a child restraint system for use in a vehicle with seat assembly equipped with standard anchorage units. The child restraint system may also be used in a vehicle using a safety belt or other securing means. More particularly the present invention relates to an energy absorbing child restraint system.

BACKGROUND

Most child restraint systems are currently designed to be fitted in a vehicle seat and secured to it by using a vehicle's adult lap and diagonal seat belt, or sometimes just the lap belt. However, vehicle seats, seat belts and their anchorages vary greatly between different models of vehicles; the seats have different shapes, the seat belts may be shorter or longer, the position of the anchor points differs etc. All these factors make it virtually impossible to make a child restraint system that fits in all vehicles and this sometimes make it complicated or even impossible to fit the child restraint system correctly.

A child restraint system is described in GB 2.417.416. The system comprises a body having a base portion and a seat portion which comprises adjustable restraining means for securing a child passenger therein, The seat portion is connected to the base portion via seat mounting means and is capable of movement relative to the base portion in a direction that is consistent with the direction of vehicle travel. The base portion includes anchor means for fixing the body to the interior of the vehicle, an energy absorbing apparatus for absorbing some of the energy generated during a vehicle collision, and a regulator coupled to the adjustable restraining means such that adjustment of the adjustable restraining means also results in adjustment of the amount of energy absorbed by the energy absorbing apparatus during a vehicle collision.

U.S. Pat. No. 5,685,603 describes a child seat located on rails. The slide rails are fixed at both ends to the body of the vehicle. The seat can slide along the rails during a collision and the force of the collision is separately absorbed by a variety of energy absorption means.

US 2009/0273215 discloses a child safety seat for installing a baby on a vehicle sea. where the safety seat comprises a seat structure and an intermediate structure providing the connection between the seat structure and a standard anchor unit associated with the vehicle seat.

U.S. Pat. No. 7,488,034 discloses a child safety seat assembly. including a base for being positioned on a vehicle seat bottom. An anti-rebound bar is carried by the base and extends outwardly and upwardly from a foot end of the base for engaging a seat back of the vehicle to which the seat is attached for retarding inertia-induced rotation of the base and the attached carrier by transmitting rotational force applied to the seat during a sudden change in velocity into the seat back of the vehicle seat onto which the seat is attached.

U.S. Pat. No. 7,328,946 discloses a chassis which is suitable for supporting a child vehicle seat, where the chassis is provided with a frame and connectors that can be detachably connected in use to securing elements that are present in a vehicle. The chassis is further provided with an unlocking mechanism for releasing the engagement between the connector and the securing element.

U.S. Pat. No. 7,044,549 discloses a child safety seat, where the child safety seat comprises a seat structure having a base support for resting on a vehicle seat cushion and a seating surface for a child occupant. A rigid link is attached to the child safety seat structure solely by a coupling mechanism that permits angular movement of the child seat structure relative to the rigid links about an axis located above the base support surface. A releasable connector is mounted on the rigid link for engagement with a standard anchorage unit associated with the vehicle seat.

Based on the above mentioned compatibility problems, there has arisen a need for a standard system for fitting a child restraint in a vehicle. In an attempt to standardize the securing of a child restraint to a seat assembly for a vehicle, seat assemblies have been modified to accomplish this means. In particular, anchorage points in the form of loop fasteners are secured to a frame of the seat assembly, between the seat cushion and the seat back. These loop fasteners are commonly referred to as ISOFIX steel bars (ISOFIX stands for "International Standards Organisation FIX"). A latch mechanism in the form of latches or clips extending out from the bottom of the child restraint engages the loop fasteners to provide a positive attachment of the child restraint to the seat assembly.

However, if a vehicle with an ISOFIX system is involved in a vehicle crash, where the vehicle, due to the crash, is exposed to sudden deceleration, the forces involved will try to rotate the child restraint about the anchorage points. This will occur since the mass centre point of the child restraint and the child are located above the anchorage point. The child restraint will then rotate either downwards into the vehicle seat or upwards towards the roof of the vehicle, depending on whether the collision is from the behind or from the front. In both cases the rotation will result in that the child is moved. As a child's head is relatively heavy compared to the rest of the body, it is desirable to reduce the head displacement of the child to a minimum in order to protect the child from severe injury.

In order to solve this problem several technical solutions have been proposed. One idea includes the introduction of a third anchorage point, such as a top tether connecting a back portion of the child restraint to the vehicle seat, or a floor support to minimize the rotation of the child restraint during sudden deceleration.

SUMMARY OF THE INVENTION

The object of the present invention is to provide a solution which improves crash behaviour of the child restraint, and which offers an easy installation of the child safety seat in the vehicle, at the same time as minimizing the risk for misuse.

In the following, the expression "forward" refers to the forward driving direction of the vehicle. Using the forward driving direction of the vehicle as a reference, the terms backward, upward and downward correspond to the ordinary terms when defining directions in a vehicle.

According to the present invention the child restraint system comprises a base haying a lower surface resting on a sitting portion of a vehicle seat. The base is provided for engagement with anchorage means in the vehicle seat. This engagement provides preferably a pivot connection between the base and the anchorage means.

A child seat is releasable connected to the base by appropriate means. In order to minimize the rotation of the child restraint during a collision, the base of the child restraint is provided with an impact absorbing mechanism in the form of at least one ISOFIX connector and at least one blocker element, where the blocker element in an extracted position of the ISOFIX connector abuts against and locks the ISOFIX connector in this position under normal utilization of the child restraint. If the vehicle is involved in a crash from behind, where the vehicle, due to the crash, is exposed to sudden deceleration, then the blocker element will be forced out of abutment with the ISOFIX connector, thereby allowing the ISOFIX connector to slide into the base. This will result in the child restraint, after the blocker element has been brought out of abutment with the ISOFIX connector, moving towards the vehicle seat, whereafter the child restraint will begin to rotate. Since the impact energy from the collision has partly been absorbed in the process of bringing the blocker element out of abutment with the ISOFIX connector, the remaining impact energy will not be able to rotate the child restraint as much, as if not the energy has been absorbed. Consequently, the rotation of the child restraint is reduced.

In a preferred embodiment of the present invention the child restraint system comprises two ISOFIX connectors, where the ISOFIX connectors are slidably arranged within voids in the base. These voids are arranged with a given distance between each other, being placed towards the ends of the base, when seen in the longitudinal direction of the base (i.e. when the base is secured into the vehicle seat in its normal position of use). This will stabilize the child restraint in a sideway direction.

The ISOFIX connectors may have any suitable form, but preferably they have a square form. In order to allow the ISOFIX connectors to slide in the longitudinal direction of the voids, the voids will have a corresponding form to the ISOFIX connectors and they have a slightly larger cross section than the ISOFIX connectors.

The voids may be provided on their inside with an arrangement that will prevent the ISOFIX connectors being pulled completely out of the voids. In its simplest form, this arrangement may involve both the voids and ISOFIX connectors being provided with a flange, where the abutment of the flanges will prevent further movement of the ISOFIX connectors.

When the ISOFIX connectors are retracted in their innermost position in the voids, a holding device will hold the ISOFIX connectors in this position. The holding device is arranged in the closed end of the void and may in a preferred embodiment be a magnet.

The ISOFIX connectors may be manufactured as solid elements or they may be hollow in order to save weight. Furthermore, they can be made from any suitable material, but they have to be dimensioned to withstand the force that they may be exposed to.

One end of the ISOFIX connector comprises a latch or a clip that will engage with anchorage means in the vehicle seat. As these latches and anchorage means are used as standards, a skilled person will know how these are designed, and will therefore not be described further in the description.

The blocker element is arranged in a recess at the upper side of the base, where the blocker element is fastened to the recess through a pivot connection. In its simplest form the pivot connection may be a pin fastened in the recess and extending across and through the blocker element. The pin is arranged near the middle of the blocker element. A skilled person should understand that the blocker element may also be arranged in other pivotal ways within the recess.

In a preferred embodiment of the present invention the blocker element is spring-loaded, where an elastic element, for instance a spring, is arranged between a holding surface in the recess and a cavity in the blocker element. The placement of the spring is preferable outside the pivot connection, towards one end of the blocker element. The placement of the spring relative the pivot connection will cause the blocker element to be forced towards its starting position (where the spring is not compressed). In order to prevent the blocker element rotating completely through the recess, a stop surface is arranged in the recess. When a portion of the blocker element abuts against this stop surface, the blocker element will be prevented from further rotation.

In this position a stud on the blocker element will protrude through the recess and into the voids, where the ISOFIX connectors are arranged. The stud will then be abutting against one end of the ISOFIX connectors, thereby "locking" the ISOFIX connectors in this position. The portion of the stud that abuts the ISOFIX connectors has a curved surface. This will result in the stud being forced out of abutment with the ISOFIX connectors if it is subjected to a force, for instance from a vehicle collision. In this case the ISOFIX connectors will be pushed towards the curved portion of the stud; if this force exceeds a certain value, the stud will be forced to rotate around the pivot connection and eventually the ISOFIX connectors will be able to slide into the voids. This will result in the child restraint moving towards the vehicle seat, and first after that the ISOFIX connectors have reached their innermost position in the voids, will the child restraint rotate around the anchorage points in the vehicle seat. However, as some of the impact energy has been absorbed during the process of pushing the stud out of engagement with the ISOFIX connectors, the remaining impact energy will not be able to rotate the child restraint as much as if the impact energy has not been absorbed. This will reduce the rotation of the child restraint.

In one other embodiment, instead of rotating out of abutment with the ISOFIX connectors, the stud may break, whereby the ISOFIX connectors can slide into the voids.

The blocker element may be manufactured as a solid piece, but it may also be manufactured as a hollow piece.

Furthermore, one may also arrange the stud as a "pushbutton", where a certain force is needed in order to push the stud into the blocker element. When the stud is forced into the blocker element, the ISOFIX connectors may be moved into the voids.

The child restraint according to the present invention is especially suitable for small children belonging to the group 0+. The term 0+ is used to categorize children having a body weight up to 13 kg. A safety seat for this group of children will be placed in the vehicle facing backwards. However, the invention as described in this application may also apply to safety seats for other groups of children, thus the safety seat may also face forward. For this reason the child restraint is provided with belt guide units and fastening means for the vehicle seat belt.

Figure 2:
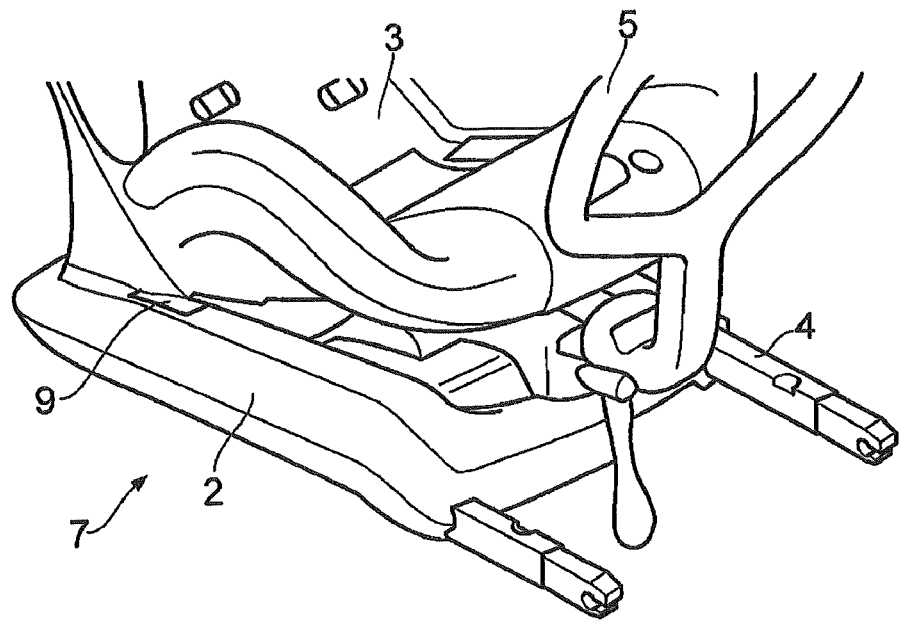
Figure 3:
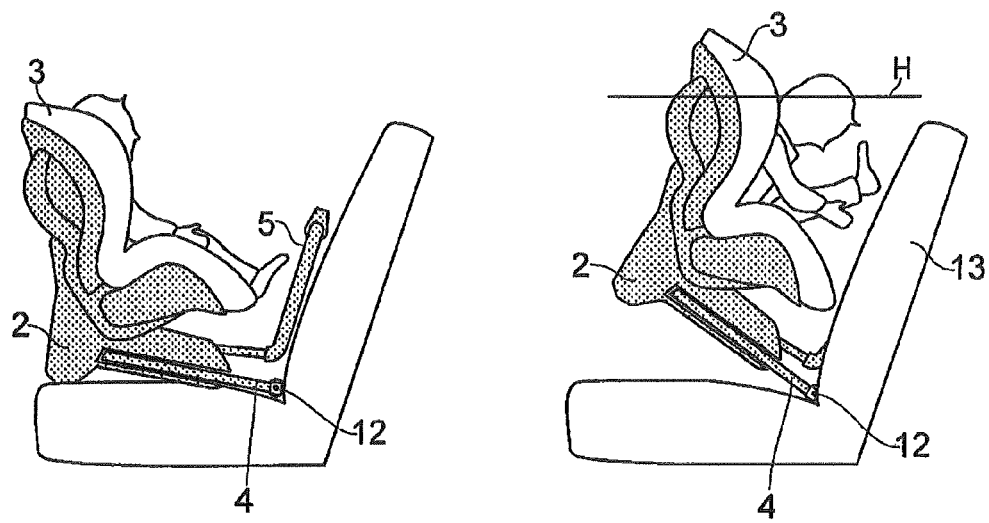
Figure 4:
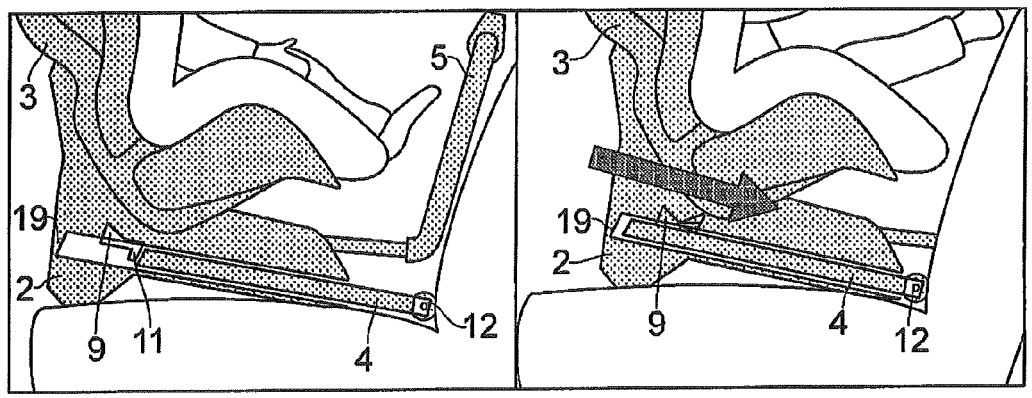
Figure 5:
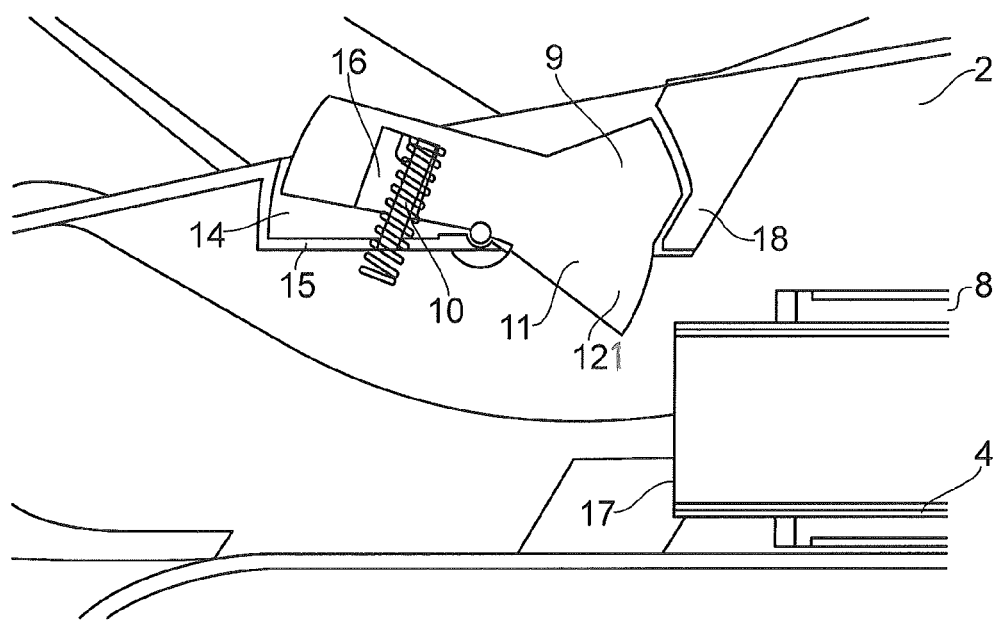

The foregoing and other features of the present invention will become apparent to one skilled in the art to which the present invention relates upon consideration of the following description of the invention with reference to the accompanying drawings, wherein:

FIG. 1 shows a child restraint system according to the present invention, where a child safety seat is used in a forward-facing position (left side) and a backward-facing position (right side) in a seat assembly of a vehicle, FIG. 2 shows in greater detail an energy absorbing system according to the present invention, FIG. 3 shows how a known child restraint system using ISOFIX will act in a collision from behind, FIG. 4 shows how the energy absorbing system according to the present invention will absorb the energy from the case shown in FIG. 3, and FIG. 5 shows in greater detail a locking mechanism for the ISOFIX connectors according to the present invention.

DETAILED DESCRIPTION OF THE INVENTION

FIG. 1 shows a child restraint system 1 according to the present invention, where the child restraint is intended to be used both in a forward-facing position (shown on the left side in FIG. 1) and a rearward-facing position (shown on the right side in FIG. 1). The child restraint system 1 comprises a base 2 and a child seat 3 that is releasable connected to the base 2. The base 2 is provided with two ISOFIX connectors 4, such that the base 2 can be connected to standard anchorage points 12 (see FIG. 3) arranged in a vehicle seat 13. The ISOFIX connector 4 is in the form of a bar and is slidably arranged within a void 8 in the base 3. A seat support 5 is connected to the base 3, where the seat support 5 through a tightening and releasing mechanism can be brought in or out of abutment with a back portion of the vehicle seat 13. This will fit the child restraint securely in the vehicle seat when the child restraint is used with the ISOFIX connectors 4. In order to further secure the child restraint, the child restraint system 1 also comprises a floor support 6 that is arranged on a back portion of the base 2 of the child restraint.

The child restraint is primarily intended to be used for small children belonging to the group 0+, where the child restraint is placed in the vehicle facing backwards (corresponding to the position shown on the right side of FIG. 1).

However, the child restraint may also be used for other group of children (larger children), where the child restraint is then used in a forward facing position. The child restraint is therefore also provided with belt guidance slots, in order to be fastened with, for instance, a three point seat belt. When using the child restraint in this position (corresponding to the position shown at the left side of FIG. 1), both the seat support 5 and the floor support 6 are removed from the child restraint.

As the child restraint, when used with the ISOFIX system, tends to rotate about the anchorage points 12 when exposed to sudden decelerations, the child restraint system 1 comprises an impact absorbing mechanism 7. This impact absorbing mechanism 7 is shown in FIG. 2, Here it can be seen that the child seat 3 is connected to the base 2 in an appropriate way. The base 2 is designed with two voids 8 extending in a longitudinal direction of the base 2, in which voids 8 the ISOFIX connectors 4 are arranged in a slidable manner. In order to adjust the length of the ISOFIX connectors 4 (i.e. the length that the ISOFIX connectors 4 extend outside the base 3), the impact absorbing mechanism 7 comprises a blocker element 9 that will cooperate with the ISOFIX connectors 4. The blocker element 9 is arranged in a recess in the base 2 and fastened to the base 2 through a pivot connection (not shown). The pivot connection may, for instance, be a pin fastened in the recess and extending through the blocker element 9. Further, the blocker element 9 is spring loaded, where a spring 10 is arranged between a holding surface in the recess of the base 2 and a cavity in the blocker element 9. The blacker element 9 comprises a stud 11 that will protrude into the void 8 in the base 2, where the stud 11 will abut against an end of the ISOFIX connectors 4 when the ISOFIX connectors 4 are pulled out from the base to their foremost position. The ISO-FIX connectors 4 are then "locked" in this position.

In an alternative embodiment of the present invention the ISOFIX connectors 4 are arranged with a plurality of recesses on their side facing the stud 11 of the blocker element 9. The stud 11 will then cooperate with the recesses in the ISOFIX connectors 4. When the ISOFIX connectors 4 are to be adjusted, the blocker element 9 is pushed downwards against the base 2, whereby the stud 11 is brought out of contact with the recess in the ISOFIX connectors 4, and the ISOFIX connectors 4 are then free to be moved in a longitudinal direction of the voids 8. As the desired extension for the ISOfix connectors 4 is obtained, the blocker element 9 is released, and due to the spring 10, the stud 11 of the blocker element 9 will again abut a recess in the ISOFIX connectors 4. The ISOFIX connectors 4 are then "locked" in this position.

A portion 12 of the stud 11 that is facing or abutting the ISOFIX connectors 4 is, according to the present invention, shaped with a curved surface, where this curved surface will manage to withhold the ISOFIX connectors 4 in their "locked" or blocked position within a certain load. If this load that the stud 11 is exposed to, is exceeded, for instance during a vehicle crash (collision from behind), the blocker element 9 will, due to its form, be forced out of abutment with the ISOFIX connectors 4, whereby the ISOFIX connectors 4 can slide into the void 8. The child restraint will then firstly be moved towards the vehicle seat, as the ISOFIX connectors 4 are allowed to slide in the voids 8, whereafter the child restraint will begin to rotate around the anchorage points 12. However, as some of the impact energy has been "absorbed" during the releasing process of the ISOFIX connectors 4, the rotation of the child restraint will be reduced.

FIG. 3 shows how a known child restraint using the ISOfix connection will act upon impact from behind, where it is seen that the child restraint will rotate around the anchorage points 12. If one has forgotten to secure the child restraint with the top tether, the child restraint will move upwards towards the roof of the vehicle and in some cases exceed a height limit H. This may cause severe injury to the head of the child placed in the child restraint. The height limit H is, according to regulations, a maximum height the child restraint is allowed to rotate during a collision form behind.

FIG. 4 shows the child restraint system 1 according to the present invention, where the left side of the figure illustrates a normal driving condition and where the right side of the figure illustrates a collision from behind. The child restraint is secured to the vehicle seat, as the ISOFIX connectors 4 are engaged with the anchorage points 12 in the vehicle seat 13 and the seat support 5 is brought into a tightening position with the vehicle seat 13. During normal driving conditions, the blocker element 9 is abutting against the end of the ISO-FIX connectors 4, thereby preventing the ISOFIX connectors 4 to be moved relative to the base 2. During a collision from behind, the base 2, comprising the child seat 3 and the child, and the ISOFIX connectors 4 will be forced towards each other. If this impact energy exceeds a certain value, the blocker element 9 will be forced out of abutment with the ISOFIX connectors 4, thereby rotating around it pivotal connection. This will allow the ISOFIX connectors 4 to slide past the blocker element 9 and into the void 8. This results in the base 2 being moved firstly towards the vehicle seat. When the ISOFIX connectors 4 are completely received within the voids 8, the child restraint will begin to rotate around the anchorage points 12. However, as some of the impact energy has been absorbed by the blocker element 7 and the movement of the base 2 towards the vehicle seat 13, the remaining energy will not be able to rotate the child restraint as much as without the energy absorbing mechanism 7.

FIG. 5 shows in greater detail the energy absorbing mechanism 7, comprising the blocker element 9 and the ISOFIX connectors 4. The blocker element 9 is arranged in a recess 14 in the base 2, where the blocker element 9 is pivotally connected (not shown) to the base 2. The pivoting point is arranged near the middle of the blocker element 9. In order to obtain the desired function for the blocker element 9, the blocker element 9 is spring-loaded. A spring 10 is arranged between a bottom 15 in the recess 14 and a cavity 16 in the blocker element 9. The bottom 15 and the cavity 16 will maintain the spring between these two surfaces. The placement of the spring 10 will be outside the pivoting point. On the end opposite the placement of the spring 10, the blocker element 9 comprises a stud 11, where this stud 11 protrudes beyond the recess 14 and into the void 8, where it will cooperate with the ISOFIX connectors 4 that are arranged in the voids 8 of the base 2. When the ISOFIX connectors 4 are drawn out to their outermost position, the stud 11 will abut against the end 17 of the ISOFIX connectors 4, thereby preventing the ISOFIX connectors 4 from sliding back into the voids 8 again. As can be seen, a portion 121 of the stud 11 that is abutting or in contact with the end 17 of the ISOFIX connectors 4, has a convex surface. Consequently, the blocker element 9, when exposed to force that exceed a certain value, will be forced upwards and out of abutment with the ISOFIX connectors 4 whereby the ISOFIX connectors 4 can slide into the voids 8. The energy absorbing mechanism 7 will be able to absorb some of the impact energy, thus restricting the rotation of the child restraint.

On a side opposite the stud 11, the blocker element 9 is formed to cooperate with a stop surface 18 arranged in the recess 14. This will prevent the blocker element 9 from further rotation. In this position a part of the blocker element 9, near the spring 11 will protrude from the base. By pushing down this part, the blocker element 9 is brought out of abutment with the stop surface 18. This will compress the spring 11 and simultaneously allow the ISOFIX connectors 4 to be moved within the voids 8. When the part is released, the spring 11 will force the blocker element 9 into abutment with the stop surface 18 again.

In order to ease transport and/or storage of the child restraint, a holding device 19 is arranged in the closed end of the voids 8. This, for instance, can be a magnet that will hold the ISOFIX connectors 4 when they are in their retracted position.

The invention has now been explained with an embodiment. Only elements related to the invention are described and a skilled person will understand that one may make several alterations and modifications to the described and shown embodiment that are within the scope of the invention as defined in the following claims.

The invention claimed is:

1. A child restraint system for use in a vehicle having ISOFIX anchoring points, said system comprising a child seat releasably connected to a base, said base having a lower surface arranged for resting on a sitting portion of a vehicle seat, said base comprising at least one ISOFIX connector arranged for engagement with an ISOFIX anchoring point in the vehicle seat, said ISOFIX connector being slidable in relation to the base, said base further comprising an impact absorbing mechanism in form of at least one blocker element abutting against and arranged to lock the position of the ISOFIX connector relative to the base under normal driving conditions of the vehicle, the blocker element being further arranged to be brought out of abutment with the ISOFIX connector in response to a sudden force resulting from a collision, thereby allowing the ISOFIX connector to slide in relation to the base.

2. A child restraint system according to claim 1,
wherein the blocker element is arranged to pivot out of abutment with the ISOFIX connector in response to the ISOFIX connector pressing against the blocker element.

3. A child restraint system according to claim 2, wherein the blocker element is arranged in a recess in the base.

4. A child restraint system according to claim 3,
wherein said ISOFIX connector is slidably arranged in a void in the base, and wherein the blocker element comprises a stud protruding into the void.

5. A child restraint system according to claim 4,
wherein a portion of the stud that is abutting the ISOFIX connector has a curved surface.

6. A child restraint system according to any one of the preceding claims, wherein the blocker element is spring-loaded.

7. A child restraint system according to claim 6, wherein the spring is arranged between a surface of a recess in the base and a cavity in the blocker element.

8. A child restraint system according to claim 1,
wherein the ISOFIX connector comprises a latching portion.

9. A child restraint system according to claim 1, further comprising a holding device arranged in a closed end of a void, said holding device being adapted to releasably hold the at least one ISOFIX connector in a fixed position.

10. A child restraint system according to claim 1, the system further comprising a seat support and a floor support.

* * * * *